Nov. 22, 1966   C. J. HARRISON ET AL   3,286,414
EXTENSIBLE CAMPER

Filed Nov. 6, 1963   2 Sheets-Sheet 1

INVENTORS
CHARLES J. HARRISON
ERNEST S. FRIDLEY
BY
Eckhoff and Hicks
ATTORNEYS

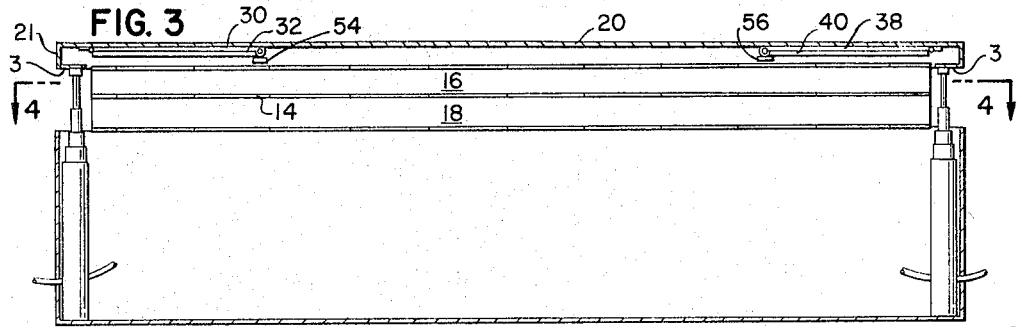
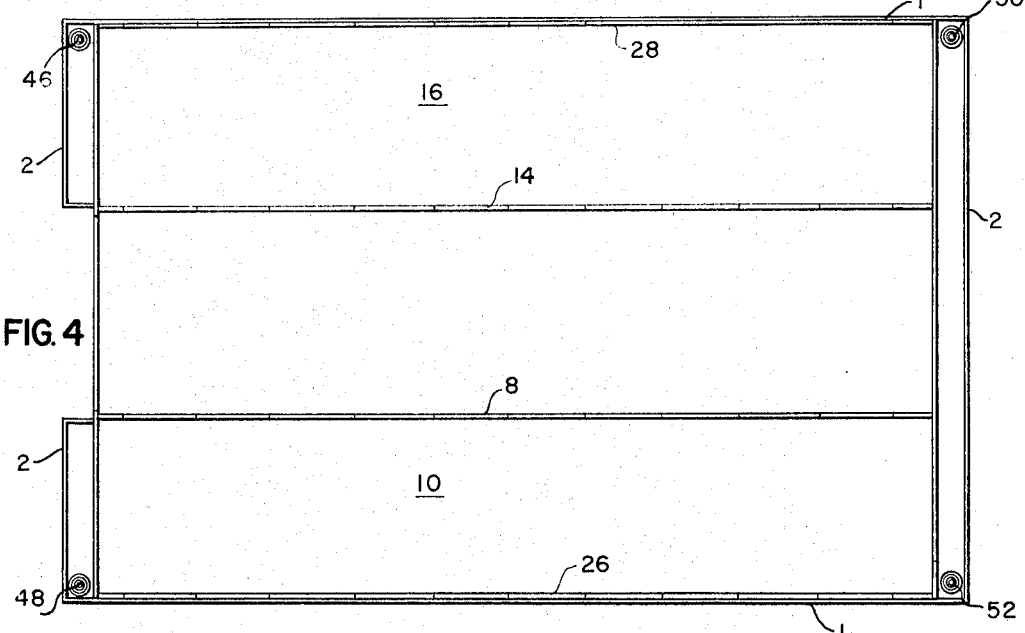
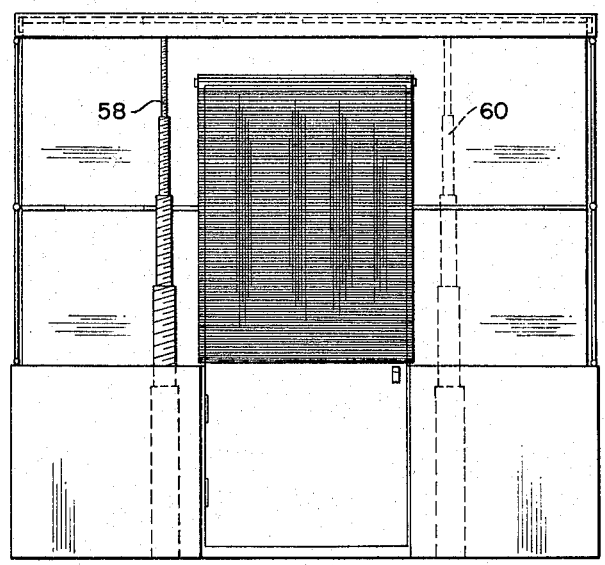

United States Patent Office 3,286,414
Patented Nov. 22, 1966

3,286,414
EXTENSIBLE CAMPER
Charles J. Harrison and Ernest S. Fridley, both of 22625 E. Cliff Drive, Santa Cruz, Calif.
Filed Nov. 6, 1963, Ser. No. 321,865
2 Claims. (Cl. 52—66)

This invention relates to a camping body adapted for use with pick-up trucks or similar vehicles, commonly known as a "camper."

Campers have heretofore been proposed which are rigid structures but they are extremely heavy and difficult to put on or remove from the vehicle. Further, such rigid structures ordinarily extend above the normal cab of the vehicle so that they are unsuitable for use by sportsmen and the like who traverse brush country, particularly country with overhanging trees and the like. Other campers have been proposed having telescoping walls but these structures are also heavy and expensive and ordinarily do not extend to the full width of the vehicle. Still other structures have soft walls and are relatively ineffective from a comfort standpoint. Other structures have been proposed having folding walls but wherein means for elevating the structure is exposed when the vehicle is in a traveling position.

It is an object of the present invention to provide a camper body which is extendible to a height higher than that of the cab of a vehicle so that there is adequate room inside, yet which can be lowered to a position wherein the camper does not occupy much more space than the truck body itself.

Another object of this invention is to provide a camper having rigid walls, which walls are provided with accordion folds so that the top of the camper can be brought into a position adjacent the truck body.

Another object of this invention is to provide a camper which is light in weight, inexpensive and easy to erect and lower.

Still another object of this invention is to provide a camper as above described wherein the means for raising and lowering the top are outside of the living space within the camper and yet which are fully concealed and protected when the vehicle is in the traveling position.

Other objects will be apparent from the balance of the specification which follows.

In the drawings forming a part of this application:

FIGURE 3 is a side sectional view, similar to FIGURE 3, with the camper in the retracted position and also showing an alternate form of jack structure.

FIGURE 4 is a sectional view on the line 4—4 of FIGURE 1.

FIGURE 5 is a rear view of a camper, similar to that shown in FIGURE 1, but employing an alternate structure wherein only two jacks are employed.

Figure 1:
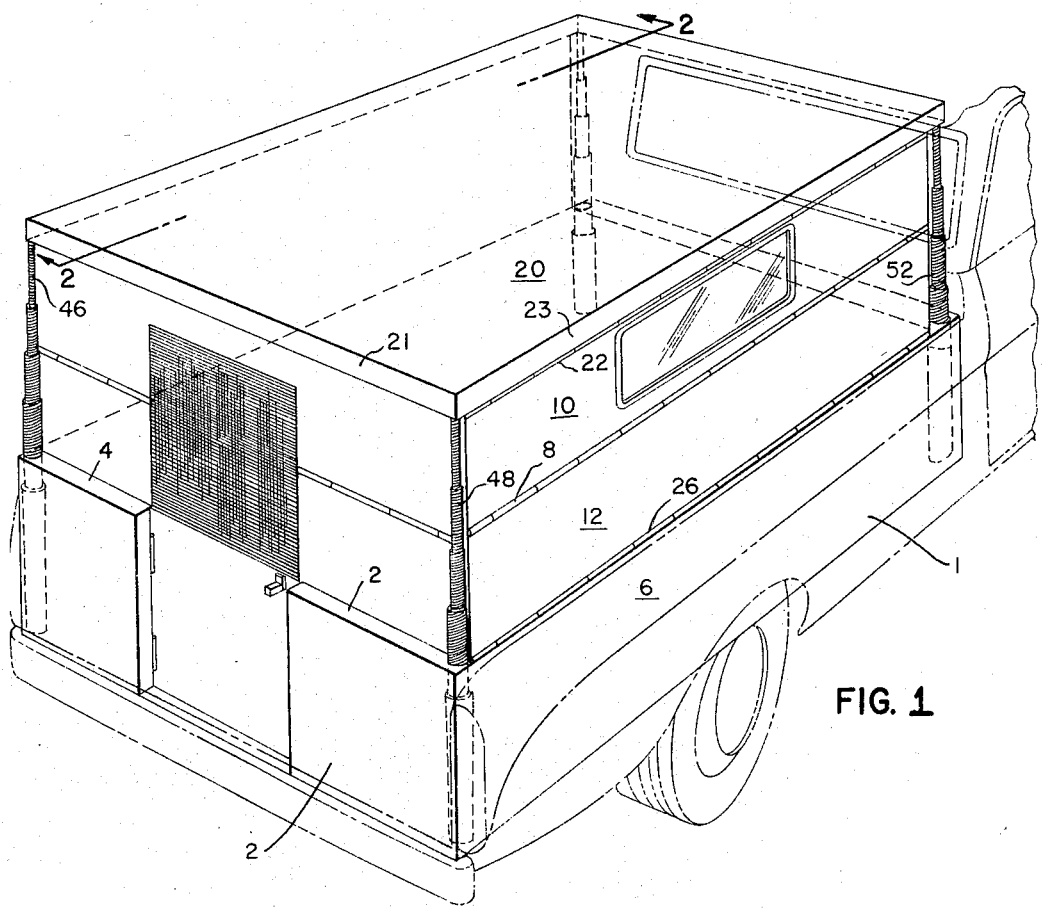
FIGURE 1 is a perspective view of a camper embodying the present invention showing the camper in the raised or extended position.

Referring now to the drawings by reference characters, there is shown a camper in place on the bed of a pickup truck 6 having planar side walls 1 and end walls 2. The extendable sides of the camper are formed from a plurality of panels and, in the embodiment shown, two panels form each side. The ends can similarly be formed of two panels or one of the ends may have only a single member. The panels themselves are connected to each other and at the top and base by means of hinges so that the panels can be folded inwardly. Thus, the hinge 8 connects upper side panel 10 with lower side panel 12 while at the opposite side the hinge 14 connects the upper side panel 16 and the lower side panel 18. A top 20 is connected to the tops of upper side panels 10 and 16 by the hinges 22 and 24, respectively, while the bottom side panels 12 and 18 are connected to the frame of the truck, or a subframe which may be attached to the truck, by means of the hinges 26 and 28, respectively. The rear of the camper is formed of two panels, namely an upper panel 30 and a lower panel 32, which are hinged together at 34. The upper panel 30 is hinged to the top side panel 20 at point 36, which is slightly inset from the end as is shown to allow space for a jack. Normally, this inset will be about two inches. Similarly, the front of the camper can be made of an upper panel 38 and a lower panel 40 hinged at 42, while the top panel is hinged to the top side panel 20 by means of hinge 44, which is similarly inset from the front.

Figure 2:
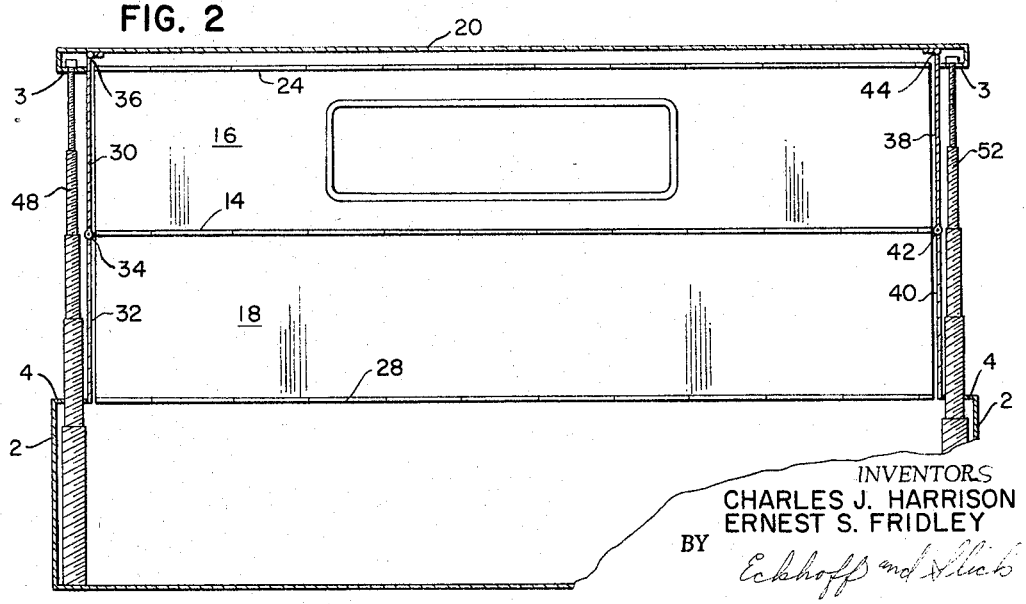
FIGURE 2 is a side sectional view on the line 2—2 of FIGURE 1.

In the embodiments illustrated in FIGURES 1–4, four jacks are used at the corners, namely rear jacks 46 and 48 and front jacks 50 and 52. These jacks may be of any desired type such as the multiple screw jacks illustrated in FIGURES 1 and 2 or the hydraulic jacks illustrated in FIGURE 3. Other forms of jacks could be used such as pneumatic jacks, cable jacks, scissor jacks and the like. In many instances, the front panel of the camper will be shorter than the rear panel in certain truck configurations, in which case the front panel of the camper may be made as a single piece hinged only at the top rather than being made of the two pieces hinged together as is shown.

It will be noted that the top side member 20 has downturned ends 21 and sides 23 and inturned flanges 3 along the ends. Thus, when the top is lowered, the downturned edges will meet with the edges of the vehicle so that the jacks are completely concealed. The end walls 2 have inwardly extending flanges 4.

In FIGURES 3 and 4, a camper is shown wherein the top has been partially lowered, the drawings showing the top just before it comes to the fully lowered position. It will be seen that the front and back have been folded on each other and lie flush against the top where they can be held by the clamps 54 and 56. The side panels fold inwardly on the hinges 8 and 14 so that when the top is down a completely enclosed, water-tight structure is provided.

In the embodiments of the invention thus far illustrated, four jacks have been used substantially at the four corners of the top. Instead of using four jacks, one can use two jacks, one at the front and one at the back of the top. Since the central opening in the back would be obstructed if the jacks were mounted in the center, preferably the jacks are staggered as is shown in FIGURE 5 so that the structure is symmetrical yet space is left for the door openings. Thus, the rear jack 58 is located adjacent to the rear door and somewhat offset from the left-hand side, while the front jack 60 is offset from the opposite side. Instead of using two or four jacks, one could use three jacks, such as providing two jacks at the opposite rear corners and one jack in the center of the front.

Although the device has been described as a camper, it is obvious that it could be used as a general utility vehicle for the delivery of merchandise and also that it might be used on a trailer rather than on a pick-up truck body.

Although the sides have been described as being formed of two panels, it is obvious that the side might be broken into four or even more panels although this is generally not necessary or desirable since it adds to the weight and complexity of the structure without a corresponding increase in utility.

It is believed apparent from the foregoing that we have provided a novel camper structure wherein the space within the camper is completely unobstructed when the camper is in the raised position and wherein the jack means for raising the roof is completely concealed when the camped is in a retracted position.

We claim:
1. In combination a truck body having upright planar side and end walls and a camper mounted thereon, said camper having a generally horizontal planar top member and downturned side and ends, said downturned sides and ends being in the plane of the respective sides and ends of the truck body, said downturned ends being inturned to provide a supporting flange, hinged pairs of side and end panels hinged to said top member, the upper side of said side panels being hinged to the lower edge of said downturned sides and having their ends terminating short of the inner edge of said inturned supporting flanges, said pair of end panels being hinged to said planar top member and extending downwardly between the inner edges of the inturned supporting flange and the ends of the side panels, and jack means positioned in said truck body adjacent the inner side of each of the end walls and extending upwardly along the outer side of said hinged end panels and having their upper ends secured in contacting relation to the respective inturned supporting flanges, the upper edges of said end walls of said truck body having inwardly extending flanges through which said jack means extend and which coact with said inturned flanges of said planar top when the camper is closed, whereby said camper may be expanded into operative position or collapsed into inoperative position.

2. The structure of claim 1, wherein said jack means is spaced from the adjacent corner of said truck body.

References Cited by the Examiner

UNITED STATES PATENTS

| | | | |
|---|---|---|---|
| 1,917,824 | 6/1933 | Burns | 296—23 |
| 3,050,331 | 8/1962 | Mansen | 52—66 X |
| 3,053,562 | 9/1962 | Farber | 296—26 |
| 3,145,044 | 7/1964 | Harrison et al. | 296—23 |
| 3,194,251 | 7/1965 | Pettersen | 52—66 |

FOREIGN PATENTS

| | | |
|---|---|---|
| 676,997 | 1952 | Great Britain. |
| 822,562 | 1959 | Great Britain. |

FRANK L. ABBOTT, *Primary Examiner.*

JOHN E. MURTAGH, *Examiner.*